United States Patent [19]

Ketterlin et al.

[11] Patent Number: 5,003,928
[45] Date of Patent: Apr. 2, 1991

[54] FREEZE RESISTANT ANIMAL WATERING INSTALLATION

[76] Inventors: William S. Ketterlin, Rt. 10, Box 322, Columbia, Mo. 65201; Robert F. Jurgensmeyer, 2712 Surfside Ct., Columbia, Mo. 65203

[21] Appl. No.: 434,337

[22] Filed: Nov. 13, 1989

[51] Int. Cl.$^5$ .............................................. A01K 7/04
[52] U.S. Cl. ..................................................... 119/73
[58] Field of Search ............................. 119/73, 75, 78

[56] References Cited

U.S. PATENT DOCUMENTS

| 243,501 | 6/1881 | Brown . | |
| 763,331 | 6/1904 | Seymour | 119/73 |
| 1,215,030 | 6/1917 | Jordan . | |
| 1,310,560 | 7/1919 | Cook | 119/73 |
| 2,087,173 | 7/1937 | Uden | 119/73 X |
| 2,990,809 | 7/1961 | Phillips | 119/78 |
| 3,286,724 | 11/1966 | Sawyer | 119/78 |
| 3,559,408 | 2/1971 | Earnhart | 119/74 |
| 3,943,889 | 3/1976 | Sparber | 119/73 |
| 4,003,340 | 1/1977 | Kuzara | 119/73 |
| 4,309,962 | 1/1982 | Boozer | 119/74 |
| 4,440,112 | 4/1984 | Lilyerd | 119/73 |
| 4,625,680 | 12/1986 | Hogan | 119/74 |
| 4,813,378 | 3/1989 | Lapp | 119/74 |

*Primary Examiner*—Robert P. Swiatek
*Attorney, Agent, or Firm*—Kokjer, Kircher, Bradley, Wharton, Bowman & Johnson

[57] ABSTRACT

An animal watering unit includes a cylindrical tank which is closed at the bottom and buried on end with its open top near ground level. Water is supplied to the tank through supply piping controlled by a float operated valve. An insulated disk serves as a cover for the tank to inhibit heat loss through the top and also as a float which controls the float valve through an adjustable chain linkage. Incoming water is discharged into the tank in a swirling pattern at the bottom. An insulated collar surrounds the upper portion of the tank near the ground surface. This construction takes advantage of the subsurface ground heat to maintain the water temperature above freezing without the need for an electric heater or other type of heater.

9 Claims, 1 Drawing Sheet

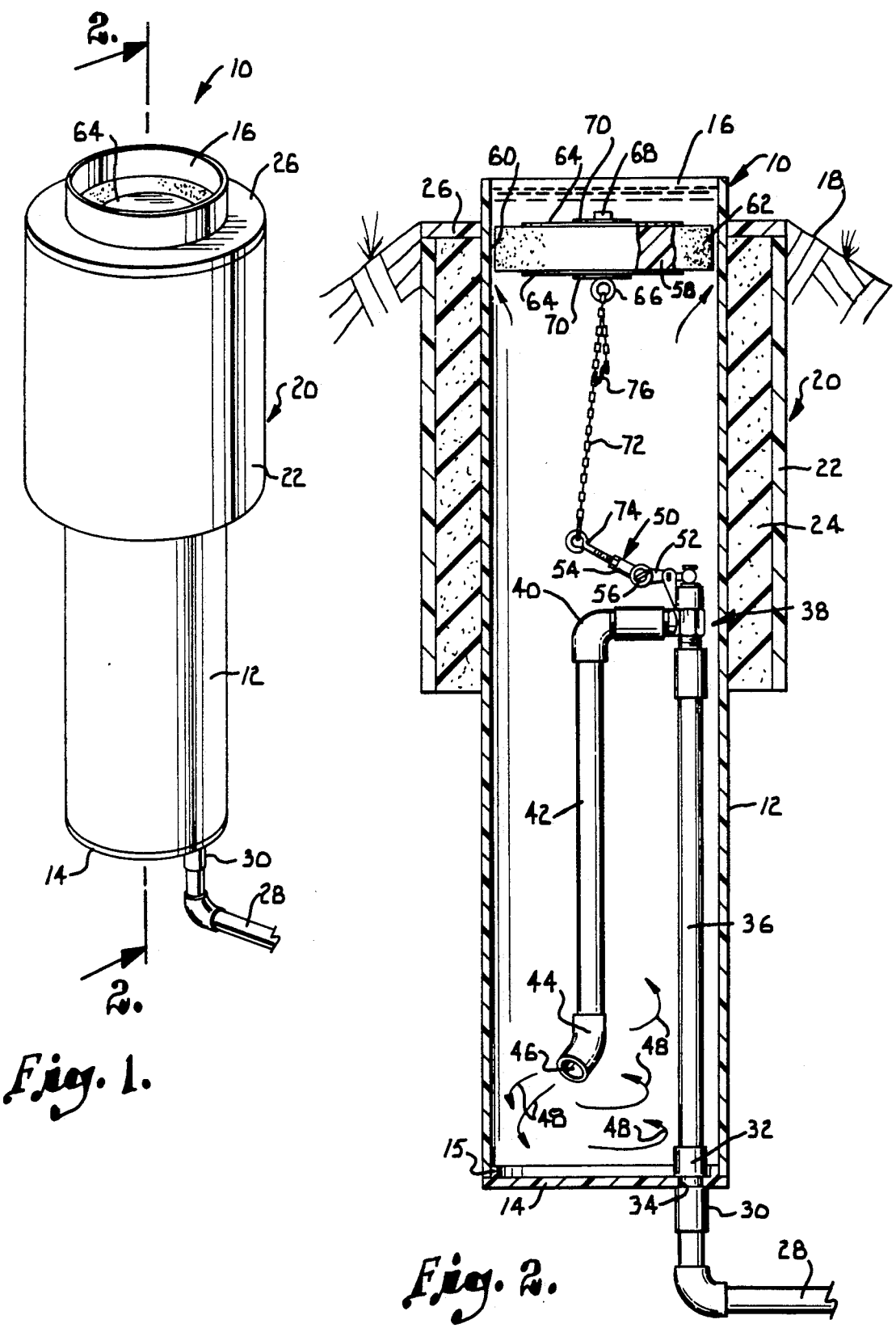

FREEZE RESISTANT ANIMAL WATERING INSTALLATION

BACKGROUND OF THE INVENTION

This invention relates generally to the provision of drinking water for animals and more particularly to a watering installation which is specially constructed to resist freezing.

In colder climates, the watering of animals, particularly cattle and other livestock, presents the problem of avoiding freeze up of the water. The animal watering installation is normally located outside where it is accessible to animals, and it is thus necessary to take special measures to keep the water from freezing. In the past, electrical immersion heaters have been used; however, the heaters are costly and consume considerable amounts of energy which adds significantly to the costs. Additionally, electrical wiring must be strung to the watering site and this presents a possible safety hazard.

While attempts have been made to take advantage use of the heat that is naturally stored in the ground, these attempts have not been wholly successful. Buried units of the type shown in U.S. Pat. No. 4,440,112 to Lilyerd have been available, but they rely on air circulation to keep the water near the surface above freezing and are not always able to do so because air is not especially effective for storing thermal energy. The top of the water container is essentially open in this type of unit, and the water can quickly freeze in especially cold weather. If a freeze up does occur, there are numerous components that can be damaged or destroyed, thus taking the unit out of service for an extended time period and requiring costly repairs.

SUMMARY OF THE INVENTION

The present invention is directed to a watering installation which automatically makes water available to livestock and other animals at all times and which is characterized by a special construction which resists freezing of the water without the need for outside power or complicated and expensive components.

In accordance with the invention, a cylindrical tank which may be formed from a length of large diameter plastic pipe is closed at the bottom and is buried with its open top end located near ground level. An underground water line supplies water through the bottom of the tank, and a float valve controls the entry of incoming water into the tank from the supply pipe. A buoyant disk which serves both as a cover and a float control for the float valve is connected by a chain linkage with the actuating lever of the valve. The discharge end of the piping is located adjacent the bottom of the tank and is oriented to effect swirling motion of the incoming water. The top portion of the cylinder nearest the surface of the ground is surrounded by an insulating collar.

By virtue of this construction, full advantage is taken of the heat gain from the warm soil and also from the relatively warm water that enters the tank. It is a particular feature of the invention that the thermal energy which is available below the frost line is stored in the water itself, thus providing effective thermal storage because the water is able to store thermal energy much more effectively than air. In addition, the warm incoming water enters the tank at the bottom and naturally rises to displace the colder water located near the top of the tank where the surrounding temperature is colder.

The dual purpose float disk floats on the surface of the water and covers the top of the tank to avoid the significant heat loss that occurs in uncovered units. At the same time, the disk is small enough that animals can easily push it down in order to gain access to the water beneath it. The disk also controls the float valve through the chain linkage, and the water level can be varied as desired by adjusting the linkage appropriately.

The swirling pattern of the incoming water carries debris from the tank bottom upwardly with the warm incoming water, and the unit is thus cleaned each time additional water enters the tank. Additional and more thorough cleaning can be effected by intentionally holding the float disk down and allowing the water to overflow the top of the tank and carry accumulated debris out with it.

DESCRIPTION OF THE DRAWINGS

In the accompanying drawings which form a part of the specification and are to be read in conjunction therewith and in which like reference numerals are used to indicate like parts in the various views:

FIG. 1 is a perspective view of a freeze resistant watering apparatus constructed in accordance with a preferred embodiment of the present invention;

FIG. 2 is a sectional view of the watering apparatus on an enlarged scale showing the water tank buried in the ground in its installed position.

DETAILED DESCRIPTION OF THE INVENTION

Referring now to the drawings in more detail, numeral 10 generally designates a freeze resistant watering apparatus constructed according to the present invention. The watering apparatus includes a cylindrical water tank 12 which may be a section of polyvinyl chloride pipe or pipe constructed of another plastic material. Although the size of the tank 12 can vary, good results have been obtained through the use of tanks that are approximately 34 inches long and either 8 or 12 inches in diameter. The 12 inch diameter tank is sufficient to supply a medium to large number of animals, while the smaller 8 inch diameter size tank is adequate to supply a small to medium number of livestock.

The cylindrical tank 12 is closed at the bottom by a bottom cap 14 having an annular lip 15 that extends inside of the lower end of the tank 12. Preferably, the end cap 14 is PVC or another plastic which is solvent welded to the bottom of the tank to close it.

The tank 12 is buried in the ground with the longitudinal axis of the tank oriented substantially vertically and with an open top end 16 of the tank located near or slightly above the ground level 18 (FIG. 2). The upper portion of the tank 12 is surrounded by an insulating sleeve which is generally identified by numeral 20 and which includes a plastic cylinder 22 larger in diameter than the tank 12. Thermal insulation in the form of open cell foam 24 occupies the annular space formed between cylinder 22 and the outside surface of the cylinder 12. An annular cap 26 forms the top of the collar 20 and is preferably solvent welded to the cylinder 22 and the wall of tank 12. The collar 20 may be approximately 15 inches long, and it is buried below the ground level 18 with the cap 26 located at or near the ground level, and extends downwardly to a location near the frost line of the locale in which the watering apparatus is installed.

Preferably, the ground slopes away from the unit as shown in FIG. 2.

An underground water supply pipe 28 connects with a suitable water source (not shown) and delivers incoming water to the tank 12. The supply pipe 28 leads to a fitting 30 located immediately below the bottom cap 14. Another fitting 32 is located within the tank 12 on top of the bottom cap 14 and is connected with fitting 30 through an opening 34 which is drilled in the cap 14. A stand pipe 36 extends upwardly from fitting 32 and connects at its top end with a valve 38 which may be a conventional float operated valve. The downstream end of valve 38 connects through an elbow fitting 40 with a discharge pipe 42 which extends downwardly within tank 18 and carries on its end a 45° elbow 44. The elbow 44 has an open discharge end 46 which discharges incoming water into the tank 12. It is noted that the discharge opening 46 is located adjacent to the bottom 14 of the tank and is oriented at an angle which effects swirling motion of the incoming water adjacent the bottom of the tank, as indicated by the directional arrows 48 in FIG. 2.

The valve 38 is controlled by an actuating lever 50 which includes a pair of links 52 and 54 connected end to end. The links 52 and 54 are angled relative to one another, and their angle can be adjusted by loosening a thumb screw 56 and moving the links to the desired angular orientation before again tightening the thumb screw 56. The lever 50 may be pivoted upwardly to a closed position of the valve in which the valve blocks water flow from pipe 36 to pipe 42. The lever 50 can be pivoted downwardly to open the valve 38, and water is then able to flow through the valve from pipe 36 to pipe 42.

A buoyant disk 58 acts both as a float for controlling valve 38 and as an insulated cover which impedes heat loss from the water in tank 12. The level of the water in tank 12 is normally maintained at or near the ground level 18, and the disk 58 normally floats on the water in the tank. The disk 58 is slightly smaller in diameter than the tank 12 and thus provides a small annular clearance space 60 between the tank wall and the periphery of the disk. Consequently, the disk 58 can be pushed downwardly into the water in order to permit animals to gain access to the water which is normally covered by the disk 58.

The disk 58 is preferably constructed of an open cell foam which provides good thermal insulation and which is covered by a plastic cover 62 that resists abrasion. Structural reinforcement is provided at the top and bottom by rigid disks 64. An eye bolt 66 extends through the center of disk 58 from bottom to top and receives a nut 68 on its top end. The head of the eye bolt 66 and the nut 68 may be provided with washers 70.

A linkage which connects disk 58 with the valve actuating lever 50 is formed by a flexible chain 72 and an eye bolt 74 which is threaded into one end of link 54. The lower end of chain 72 is secured to eye bolt 74 and its opposite end is equipped with an S hook 76. The chain 72 is threaded through the eye bolt 66, and the S hook 76 is hooked to a selected link of the chain 72 in order to set the effective length of the chain 72 and thus the water level in tank 12.

In use, relatively warm incoming water (at about 55° F., which is the temperature of the surrounding soil) enters the tank 12 from the supply pipe 28 and flows through pipe 36 and the valve 38 into pipe 42 whenever the valve is open. The incoming water discharges through the elbow 44 in the swirling pattern indicated by the directional arrows 48. As the water level in tank 12 rises, the buoyant disk 58 eventually rises until the chain 72 pulls lever 50 upwardly far enough to close the valve 38. It is contemplated that this will occur when the water level rises to approximately the ground level 18. However, it should be noted that the water level at which the incoming water flow is cut off can be adjusted by adjusting the effective length of the chain 72 and also by adjusting the relative angle of the two links 52 and 54 which form the valve actuating lever 50.

The lower portion of the tank 12 located below the insulating collar 20 is maintained in a relatively warm state due to the warmth of the surrounding soil (about 55° F.). The upper portion of the tank 12 is thermally insulated by the collar 20. Additionally, the thermally insulated disk 58 provides a floating cover on top of the water in order to impede heat loss through the top of the tank. It is noted that this is a source of potentially significant heat loss and that the disk 58 is effective in inhibiting heat loss through the top of the unit, since the only space that is available is the relatively small annular space 60. Consequently, the water which is contained in the tank 12 is prevented from freezing in even the coldest weather. It should be noted that the warmer water near the bottom of the unit naturally tends to rise and displace the colder water near the top.

Livestock and other animals can gain access to the water through the top end 16 of the tank by pushing downwardly on disk 58 with their noses. When the animals have consumed enough water for the disk 58 to have descended far enough to cause valve 38 to open, additional water is automatically supplied to the tank 12 through the open valve. The incoming water enters the unit in the swirling pattern indicated by the directional arrows 48, and because the incoming water is relatively warm, it quickly rises within tank 12 in a swirling pattern and carries along with it any debris that has accumulated near the bottom 14 of the tank. In this manner, the swirling pattern of the incoming water serves to periodically raise debris to the surface where it can be removed from the tank. At the same time, the relatively warm water flows upwardly near the top of the tank to displace colder water, thus adding to the ability of the unit to resist freezing of the water.

It is noted that the automatic watering unit 10 is constructed in a simple manner with standard and inexpensive components. The only moving parts are those associated with the float valve 38, and the valve can be a relatively inexpensive commercially available unit. Installation of the watering unit 10 can be carried out quickly and easily, as all that needs to be done is excavation and connection of the stand pipe 36 with the water supply pipe 28. Consequently, the cost to manufacture unit 10 is relatively small, and its installation costs are minimal.

If desired, the unit 10 can be periodically cleaned of debris in a thorough manner by intentionally pushing the disk 58 downwardly and holding it downwardly long enough for the water to overflow the top end 16 of the tank and carry dirt and debris out of the tank along with the overflowing water. Again, the swirling pattern of the incoming water assists in removing debris from the tank. It should also be noted that although the watering unit 10 is intended primarily for livestock such as cattle, hogs and sheep, it can also serve to provide water to domestic animals such as dogs.

During the summer, the watering unit 10 provides significant benefits. Due to the insulating disk 58 and the insulating sleeve 20, the water in the unit is maintained relatively cool. This cooling effect is enhanced because the unit is buried and thus takes advantage of the relatively cool soil (about 55°) and its tendency to keep the water cool. Because the water is maintained cool and is also shaded from direct sunlight, the formation of algae and mosses is significantly impeded and these are not the problem they are with other systems.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. An animal watering installation comprising:
   a tank buried in the ground and having an open top accessible from ground level and a closed bottom, said tanking being substantially filled with water;
   thermal insulation around an upper portion of said tank;
   a water supply pipe extending into said tank to supply incoming water thereto;
   a discharge pipe for receiving water from said supply pipe and having a discharge end disposed within said tank in a lower portion of said tank for discharging the incoming water into said lower portion of said tank, said lower portion of said tank being below said upper portion of said tank;
   a float operated valve for controlling the flow from the supply pipe to said discharge pipe, said valve having an open position wherein water is allowed to flow from the supply pipe to said discharge pipe and a closed position wherein flow from the supply pipe to said discharge pipe is precluded;
   an animal accessible buoyant float in said tank floating on the surface of the water therein, said float being smaller than said tank to allow immersion of said float in the water such that the animals have access to the water in said tank, said float comprising thermal insulation whereby heat transfer between ambient air and the water below said float is reduced; and
   linkage means between said float and said valve for effecting said closed position of said valve when said float is above a preselected location in said tank and said open position of said valve when said float is below said preselected position.

2. The installation of claim 1, wherein:
   said tank has a substantially cylindrical configuration; and
   said float comprises a buoyant disk.

3. The installation of claim 2, wherein said thermal insulation comprises a substantially cylindrical collar surrounding the upper portion of said tank and including thermally insulating material.

4. The installation of claim 1, including means for adjusting said linkage means in a manner to vary the level of said preselected location.

5. The installation of claim 1, wherein said tank has a closed bottom and said discharge end is located and oriented to discharge water into the tank in a manner to effect swirling of the incoming water adjacent said bottom of the tank.

6. An animal watering installation comprising:
   a substantially cylindrical tank having an open top and a closed bottom, said tank being buried in the ground with the longitudinal axis of said tank oriented generally vertically and with said open top of said tank accessible to animals at ground level;
   a thermally insulating collar surrounding an upper portion of said tank;
   conduit means adapted to be connected with a source of water and extending into said tank to supply incoming water thereto, said conduit means having a discharge end located within a lower portion of said tank for discharging the incoming water into said tank;
   float operated valve means having an open condition wherein water flow through said conduit means and said discharge end thereof is permitted and a closed condition wherein said conduit means is closed to water flow;
   an animal accessible buoyant disk in said tank normally floating on the surface of the water therein, said disk being thermally insulated and having a lesser diameter than said tank to permit animals to gain access past said disk to the water in said tank; and
   a linkage connecting said disk with said valve means in a manner to effect said closed conditions of said valve means when the float is above a preselected level in the tank and said open condition of said vale means when said float is below a preselected level in said tank.

7. The installation of claim 6, wherein said discharge end of the conduit means is located and oriented to discharge water into the tank in a manner to effect swirling of the incoming water adjacent said bottom of the tank.

8. The installation of claim 6, including means for adjusting said linkage in a manner to vary said preselected level.

9. The installation of claim 6, wherein said diameter of said buoyant disk is substantially equal to that of said tank.

* * * * *